(12) United States Patent
Gill et al.

(10) Patent No.: US 6,264,229 B1
(45) Date of Patent: Jul. 24, 2001

(54) GOOSENECK TRAILER COUPLER

(75) Inventors: George Patrick Gill; Rodney Lee Peterson, both of Rockford; Damon Dirk Shaw, Byron, all of IL (US)

(73) Assignee: Atwood Mobile Products, Inc., Rockford, IL (US)

( * ) Notice: Subject to any disclaimer, the term of this patent is extended or adjusted under 35 U.S.C. 154(b) by 0 days.

(21) Appl. No.: 09/542,980

(22) Filed: Apr. 4, 2000

(51) Int. Cl.$^7$ .................................................. B62D 53/06
(52) U.S. Cl. ........................ 280/441.2; 280/504; 280/511
(58) Field of Search .............................. 280/441.2, 504, 280/507, 509, 511, 512

(56) References Cited

U.S. PATENT DOCUMENTS

| | | | | |
|---|---|---|---|---|
| 2,202,753 | * | 5/1940 | Bugatti | 280/511 |
| 2,696,392 | * | 12/1954 | Case | 280/513 |
| 2,755,105 | * | 7/1956 | Wells | 280/513 |
| 3,650,546 | * | 3/1972 | Koenig | 280/512 |
| 4,176,853 | * | 12/1979 | Brock | 280/509 |
| 5,219,436 | * | 6/1993 | Abbott | 280/512 |
| 6,050,588 | * | 4/2000 | Kissack | 280/511 |

* cited by examiner

Primary Examiner—Daniel G. DePumpo
(74) Attorney, Agent, or Firm—Porter, Wright, Morris & Arthur, LLP (57) ABSTRACT

A gooseneck trailer coupler is disclosed which secures a first structure such as a towing vehicle to a second structure such as a trailer. The coupler is provided with a mounting element extending from the first structure, a chuck having a top end and a base at a bottom end opposite the top end, with the chuck attached to the mounting element at the top end and adapted to receive a ball mounted to the second structure. A locking assembly is adapted to releasably secure the ball and the chuck, and comprises a ring gear mounted around the chuck and movable from a locking position where the chuck is secured with the ball and an unlocking position where the chuck is unlocked from the ball, wherein the ring gear translates from the base toward the top end of the chuck as the ring gear moves from the locking position to the unlocking position. The locking assembly can also comprise at least one jaw mounted in the chuck for engaging the ball when the ring gear is in the locked position. A novel release lever assembly is also disclosed which moves the ring gear.

18 Claims, 6 Drawing Sheets

GOOSENECK TRAILER COUPLER

FIELD OF THE INVENTION

The present invention is directed to couplers for releasably connecting components together, and more particularly to improvements in gooseneck trailer couplers for securing a trailer to a tow vehicle.

BACKGROUND OF THE INVENTION

Gooseneck trailer couplers are used to secure a first structure such as a towing vehicle to a second structure such as a trailer. Examples of known trailer couplers include U.S. Pat. Nos. 5,513,871 to Johnson, 5,263,735 to Mann, and 5,382,109 to Nyman. Such known designs typically rely on plates actuated by a handle, with the plates grabbing around a ball neck to secure a ball mounted on the trailer with the towing vehicle. It would be highly desirable to provide a gooseneck trailer coupler which is of a compact, high strength design and which provides a clear indication that the trailer coupler is locked.

In view of the foregoing, it is an object of the present invention to provide a gooseneck trailer coupler which is of simple construction and low cost, and which locks with the ability to endure high loading. It is an additional object of the present invention to provide a gooseneck trailer coupler that provides clear indication to the operator that the lock is in place. It is an additional object of the present invention to provide a gooseneck trailer coupler that is highly reliable in operation and which can be manufactured efficiently. Additional objects and optional features of the invention will be apparent form the following disclosure and detailed discussion of preferred embodiments.

SUMMARY OF THE INVENTION

In accordance with a first aspect, a gooseneck trailer coupler is affixed to a first structure and comprises a mounting element, a chuck having a top end and a base at a bottom end opposite the top end, the chuck attached to the mounting element at the top end and adapted to receive a ball mounted to a second structure, and a locking assembly adapted to releasably secure the ball and the chuck. The locking assembly comprises a ring gear mounted around the chuck and movable from a locking position wherein the chuck is secured with the ball, to an unlocking position where the chuck is unlocked from the ball, and the ring gear translates from the base toward the top end of the chuck as the ring gear moves from the locking position to the unlocking position.

In accordance with another aspect, a gooseneck trailer coupler is provided wherein at least one jaw is mounted in the chuck, and the ring gear moves from a locking position where the ring gear urges the jaw into an aperture in the chuck to secure a ball within the aperture to an unlocking position where the jaw is free to move sufficiently out of the aperture to permit a ball to be disengaged from the chuck.

From the foregoing disclosure and the following more detailed description of various preferred embodiments, it will be apparent to those skilled in the art that the present invention provides a significant advance in the technology and art of gooseneck trailer couplers. Particularly significant in this regard is the potential the invention affords for enhanced locking and providing high strength. Additional features and advantages of various preferred embodiments will be better understood in view of the detailed description provided below.

It should be understood that the appended drawings are not necessarily to scale, presenting a somewhat simplified representation of various preferred features illustrative of the basic principles of the invention. The specific design features of the gooseneck trailer coupler as disclosed here, including, for example, specific dimensions of the jaws and the ramp of the pinion gear housing will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the gooseneck trailer coupler illustrated in the drawings. In general, up or upward refers to the top of the paper in FIG. 1 and down or downward refers to a direction towards the bottom of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the couplers disclosed here. The following detailed discussion of various alternative and preferred features and embodiments will illustrate the general principles of the invention with reference to a gooseneck trailer coupler suitable for connecting a trailer to a tow vehicle. Other embodiments suitable for other applications will be apparent to those skilled in the art given the benefit of this disclosure.

Figure 1:
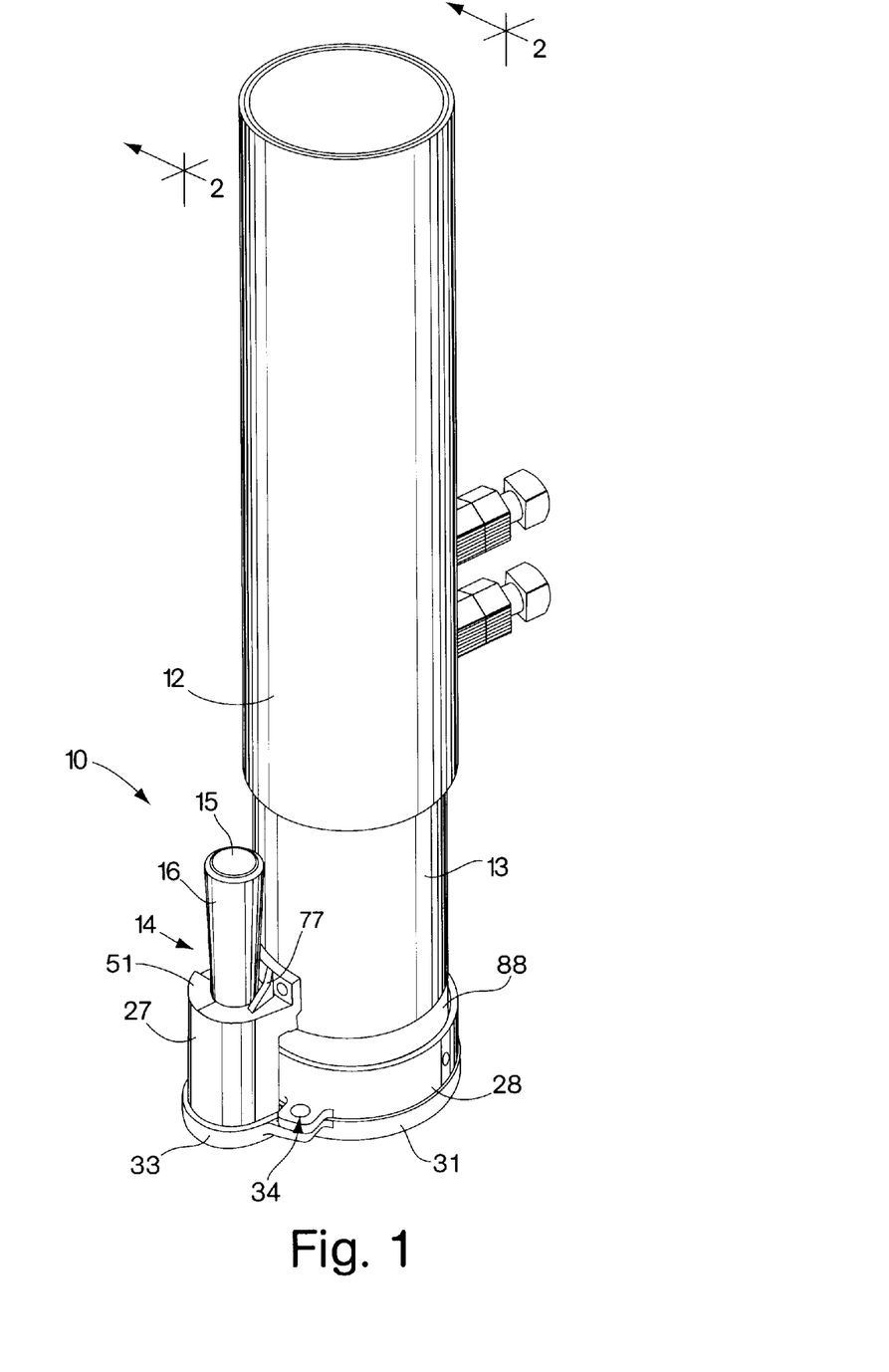
FIG. 1 is an assembled, perspective view of a preferred embodiment of a gooseneck trailer coupler in accordance with a preferred embodiment.

Turning now to the drawings, FIG. 1 shows a gooseneck trailer coupler 10 which has an elongate mounting element or tube 12, ending in a stem 13, and extending longitudinally along a first axis. The coupler 10 would typically be attached to a first mounting structure such as, for example, a tow vehicle. A chuck 31 is attached to the stem 13 by, for example welding the chuck 31 to the bottom of the stem at the top end 88 of the chuck. The chuck 31 has a base 33, and a pinion gear housing 27 is mounted on the base. A release lever assembly 14 is mounted on pinion gear housing 27 and acts to move a ring gear 28 between a locked position and an unlocked position. The pinion gear housing also has a rib 77 which serves as a guide for the release lever assembly. Holes 34 may be provided in the ring gear 28 and in the chuck 31 to receive an optional lock.

Figure 2:
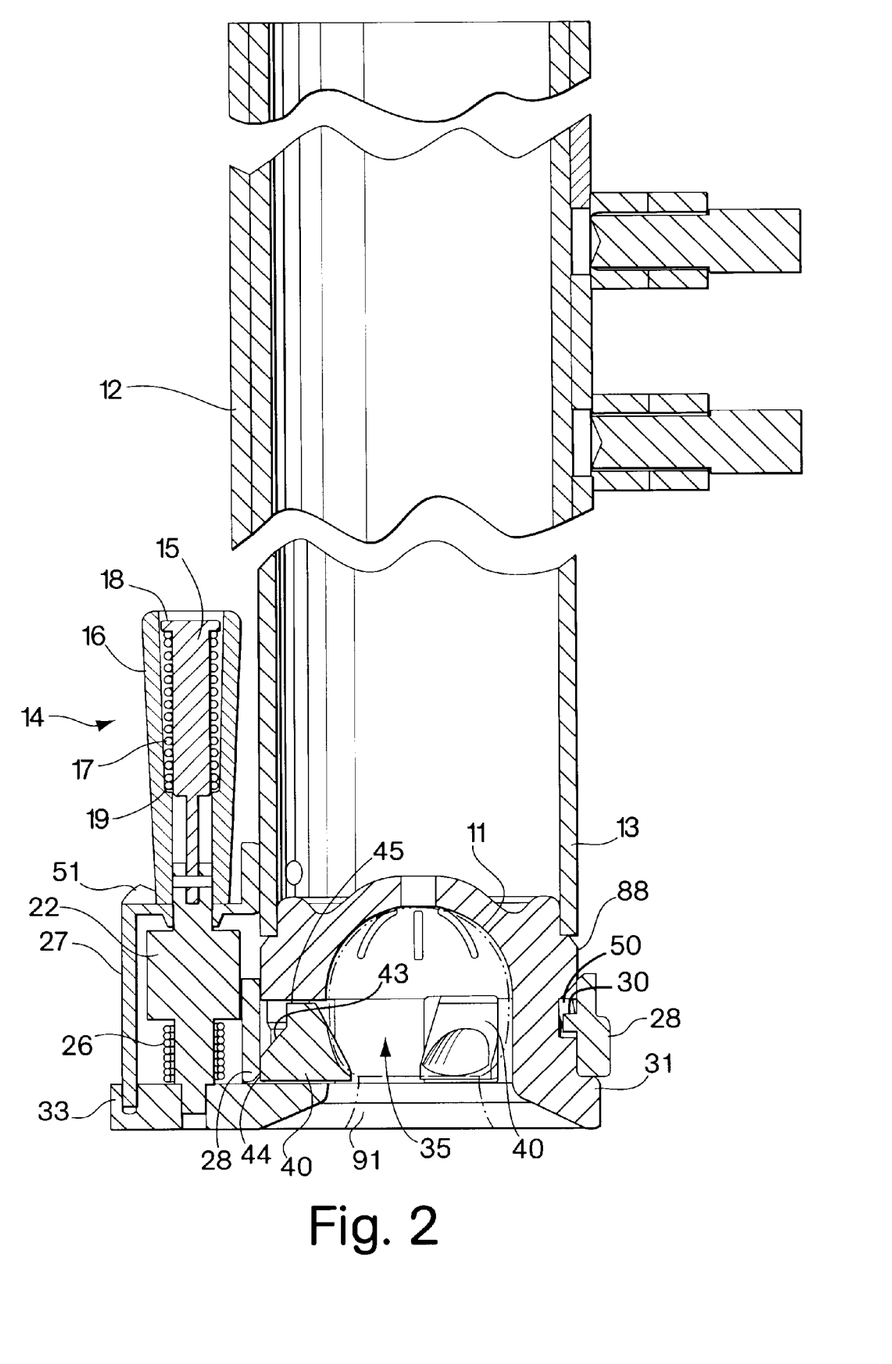
FIG. 2 is a cross section view taken along line 2—2 of FIG. 1, showing the coupler in the latching position with a ball shown in phantom.
Figure 3:
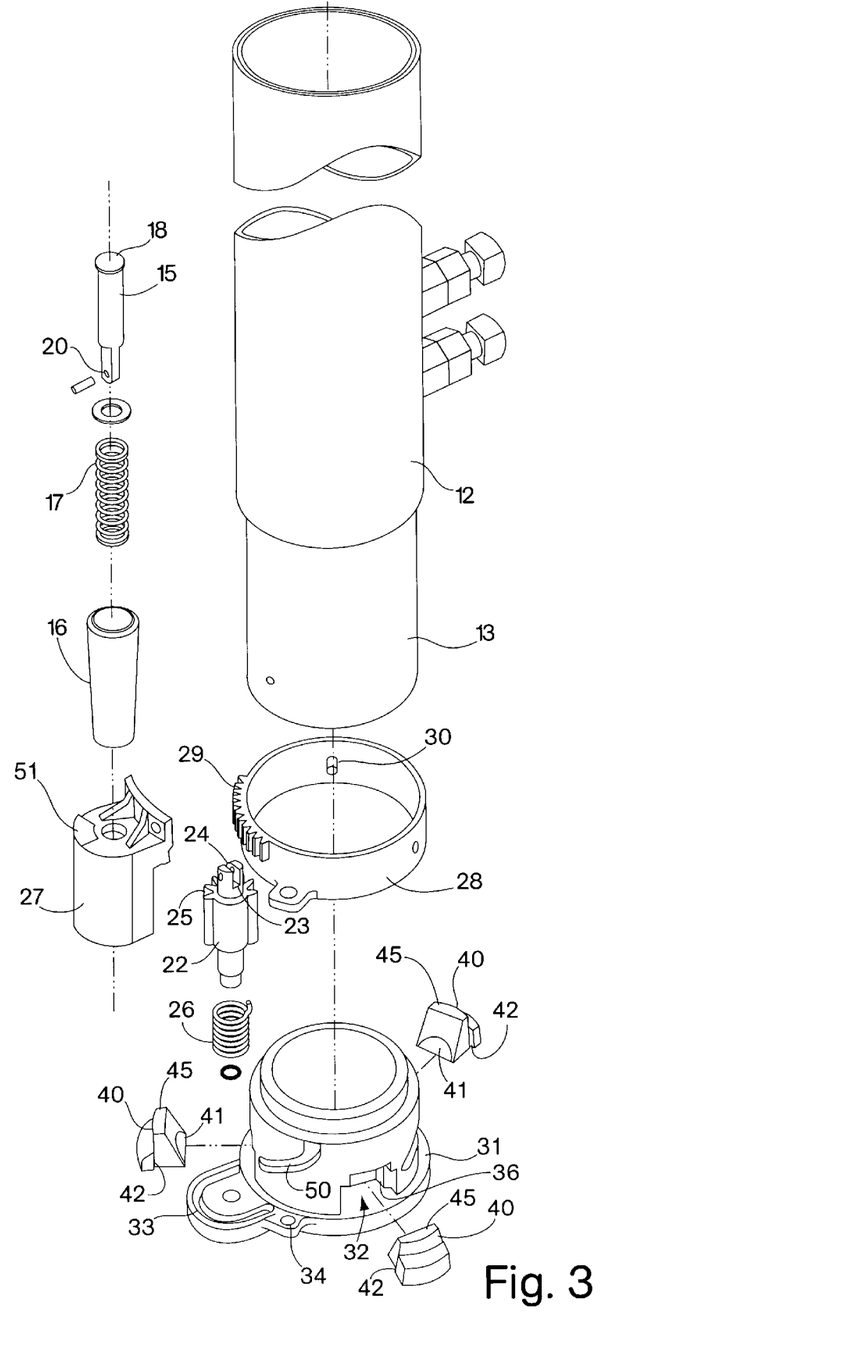
FIG. 3 is an exploded perspective view of the coupler of FIG. 1.

FIG. 2 shows the coupler 10 in cross section and locked. Chuck 31 is provided with a ball aperture 35 preferably shaped as a spherical cavity to receive a ball 11 mounted on a trailer or other second structure. The ball 11, shown in phantom, also has a neck 91 which is narrower than the width of the ball 11. At least one jaw 40 engages the neck when the coupler is locked, securing the ball to the coupler. As shown in FIG. 3, preferably three jaws 40 are used, each one equidistantly radially spaced apart from one another around the ball aperture 35 to help secure the ball within the ball aperture.

In accordance with a highly advantageous feature, ring gear 28 cooperates with jaw or jaws 40 to form a locking assembly. Ring gear 28 is mounted around the chuck 31 and is movable from a locking position (shown in FIG. 2) where the ring gear contacts a back 44 of the jaw or jaws 40, forcing the jaws into the ball aperture (and against the ball neck 91 when a ball is present), to an unlocking position where the jaws can move out of the ball aperture and the ball (if present) can be disengaged from the chuck. Thus, when the ball 11 is present in the aperture and the ring gear is moved to the locking position, the ball is secured within the chuck 31. When the ball is to be disengaged from the chuck, the ring gear 28 moves up and the jaw 40 is free to move radially outward until a tower 45 portion of the jaw contacts the ring gear.

In accordance with the preferred embodiment shown in the drawings, ring gear 28 is controlled by a pinion gear 22 mounted in the pinion gear housing 27 which is in turn controlled by a release lever assembly 14. The release lever assembly 14 comprises a handle 15, pivotably mounted on the pinion gear 22, and a handle sleeve 16 positioned around the handle 15 and movable between a down position (shown in FIG. 2) and an up position. Preferably the handle sleeve 16 is biased by a handle spring 17 toward the down position against pinion gear housing 27 or other suitable member rigidly attached to the stem 13. The handle 15 has a head 18 and the handle sleeve has a bottom 19 with the spring 17 preferably positioned between the head 18 and the bottom 19. The handle 15 is pivotable from a stow position (as shown in FIG. 2) where the handle is aligned generally parallel with the first axis of the stem 13 to a release position where the handle is aligned generally perpendicular to the first axis. Operation of the handle through its range of motion is discussed in greater detail below with reference to FIG. 7. Other mechanisms suitable for moving the ring gear between the locking and unlocking positions will be readily apparent to those skilled in the art given the benefit of this disclosure.

Preferably the ring gear 28 rotates around the chuck 31 and also translates away from the base 33 toward the top end 88 of the chuck 31 as the ring gear moves from the locking position to the unlocking position. FIG. 3 is an exploded perspective view of the coupler showing the ring gear 28 provided with a series of teeth 29 which engage corresponding teeth 25 on the pinion gear 22. Ring gear 28 has at least one pin 30 extending radially inward into corresponding grooves or slots 50 positioned on the chuck 31. Other mechanisms for translating the chuck will be readily apparent to those skilled in the art given benefit of this disclosure. The slots 50 define and limit a range of motion of the ring gear 28. A spring 26 is mounted around the pinion gear 22 and biases the pinion gear against the ring gear 28 so as to urge the ring gear to the locking position. Spring 26 also biases the handle to pivot around the pinion gear, and spring 17 biases handle sleeve 16 toward the down position, permitting the handle to return to the stow position. Pinion gear 22 is preferably provided with a slot 23 to receive the handle 15.

Figure 4:
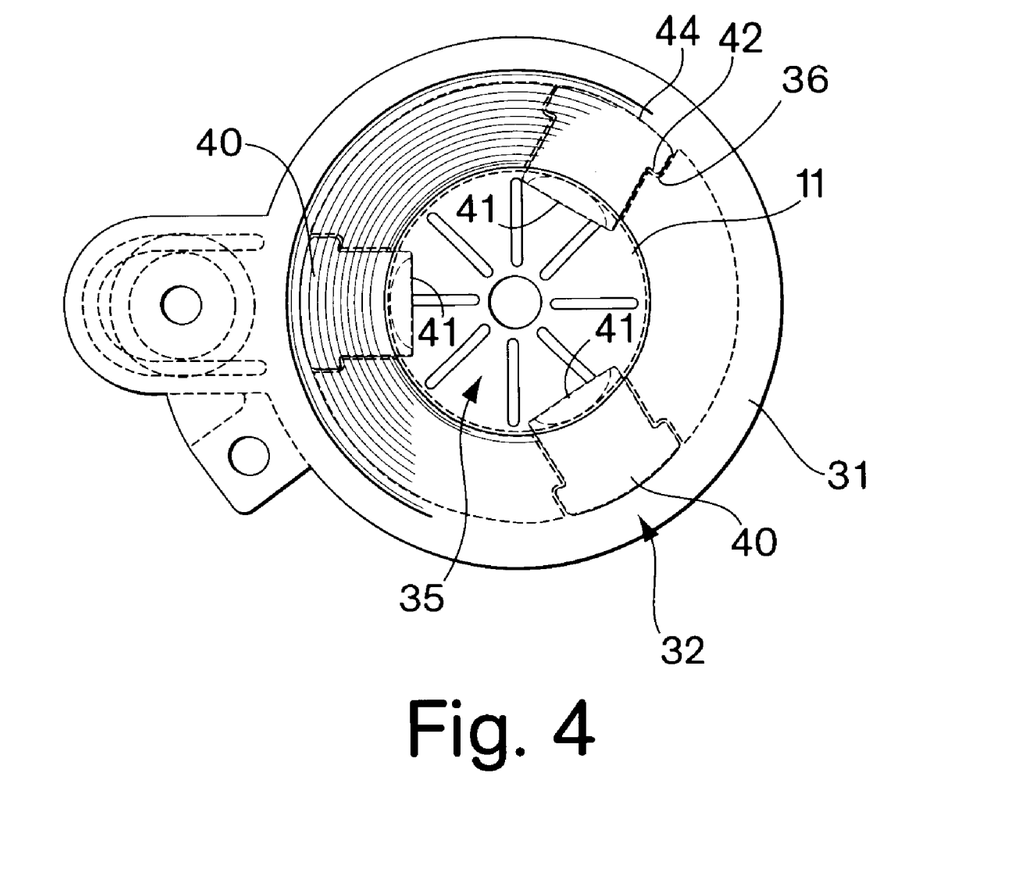
FIG. 4 is a bottom end view of the chuck, showing a ball aperture and openings in the chuck to receive the jaws.

Each jaw 40 extends into a chuck opening 32. The jaws 40 have ledges 42 and the openings 32 have a narrowing 36 which limits radial inward travel of the jaws into the ball aperture 35. FIG. 4 shows the coupler in a locked position, looking upward at ball aperture 35 formed in the chuck 31. The jaws 40 are shown positioned in their respective chuck openings 32 and engaging a ball 11. Ledges 42 abut against narrowing 36.

Figure 5:
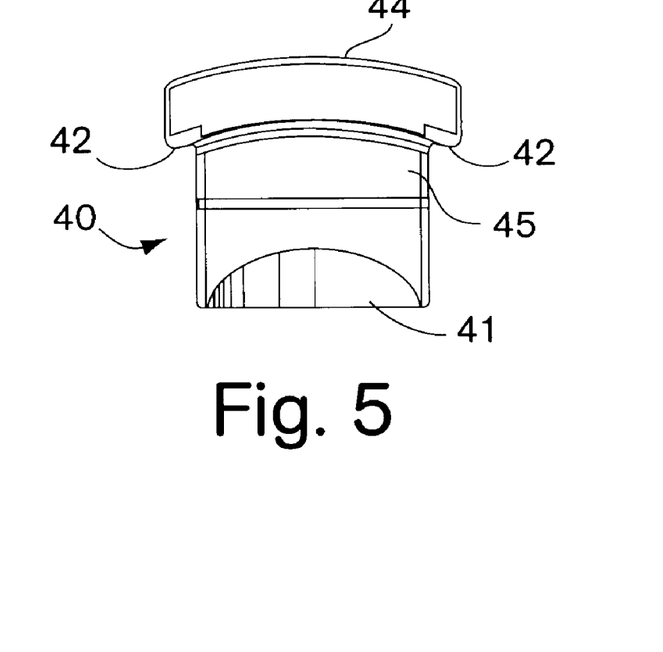
FIG. 5 is a side view of one jaw in accordance with a preferred embodiment.
Figure 6:
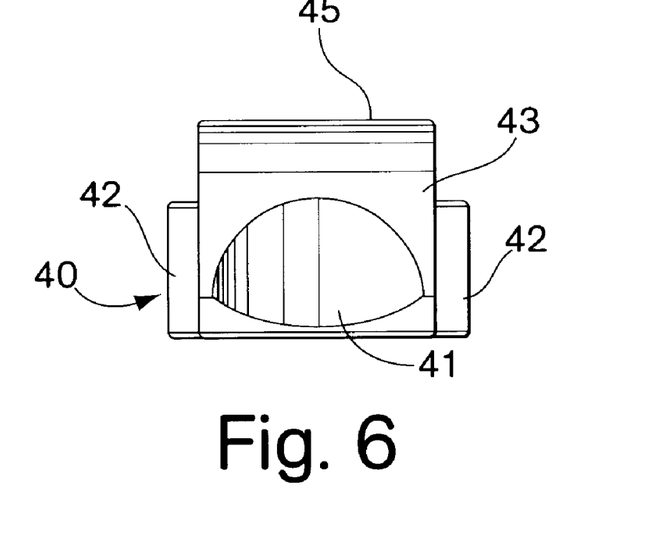
FIG. 6 is another side view of the jaw of FIG. 5.

FIGS. 5 and 6 are side views of the jaw 40, showing the back 44 which contacts the ring gear 28 when the ring gear is in the locking position, spherical surface 41 for receiving the ball neck 91 when the coupler is locked, ledges 42 as discussed immediately above, and ramped surface 43 leading to tower 45 which the ring gear engages when the ring gear moves to the unlocked position.

Figure 7:
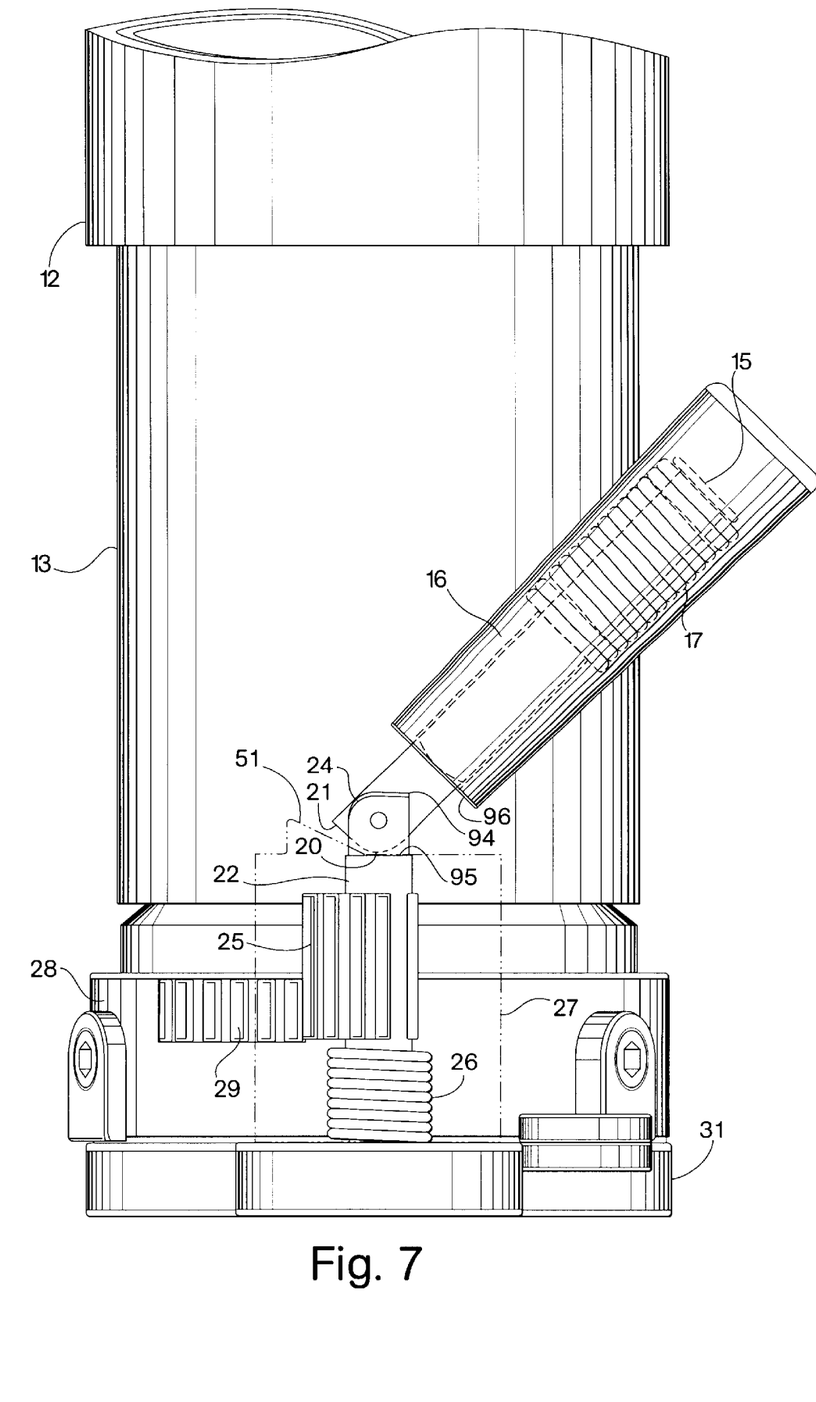
FIG. 7 is a side view of the coupler of FIG. 1 with some of the elements shown in phantom for clarity of illustration, showing a curved surface on the end of the handle and a curved surface on the end of the pinion gear.

FIG. 7 shows the handle sleeve 16 in the up position, and the handle 15 pivoted with respect to the pinion gear 22 from the stow position to an intermediate position. As long as the handle 15 pivots without the pinion gear 22 pivoting, the ring gear 28 will not move. The handle 15 must be rotated to a position generally perpendicular to the first axis of the tube 12 before it becomes easy to rotate the handle about the axis of the pinion gear 22.

In accordance with a highly advantageous feature, the handle sleeve 16 must be moved to the up position before the handle can be moved from the stow position. This is so since handle sleeve bottom 96 abuts against ledge 95 when the handle is in the stow position, preventing the handle from pivoting with respect to the pinion gear 22. The ledge 95 is shown as the bottom of a slot at the end of the pinion gear which the handle is pivotably attached to. Once the handle sleeve 16 is moved to the up position, the handle is only free to pivot from the stow position in one direction. This is so because handle 15 has a handle end with a square end surface 21 and a ramped end surface 20, and the ramped surface 20 is of sufficiently small radius that it clears the ledge 95 (as shown in FIG. 7) on the pinion gear 22 as the handle pivots to a position perpendicular to the first axis.

Once the release lever assembly 14 is in a position perpendicular to the first axis of the stem 13, the handle can be rotated until it moves past ramp 51 mounted on the pinion gear housing 27. The ramp holds the handle in the releasing position and resists spring 26 from returning the handle to the stow position. Once the handle is lifted over the ramp 51 the stored energy in spring 26 biases the handle to return to the stow position together with the bias of spring 17 against the handle sleeve 16 and the guiding feature of rib 77 of housing 27.

To assist the handle sleeve 16 in returning to the down position, the pinion gear is provided with a square end surface 94 and a ramped end surface 24. The ramped end surface 24 has a radius sufficiently small to allow the handle sleeve 16 to return to the down position without jamming or getting stuck at end surface 24. This is advantageous in reducing cyclic loading on the bottom 96 of the handle sleeve.

From the foregoing disclosure and detailed description of certain preferred embodiments, it will be apparent that various modifications, additions and other alternative embodiments are possible without departing from the true scope and spirit of the invention. For example, it will be readily apparent to those skilled in the art, given the benefit of this disclosure, that the ring gear could be provided with openings such that rotation alone of the ring gear until the jaws are aligned with the openings could be used instead of translation and rotation to get to the unlocked position. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A gooseneck trailer coupler affixed to a first structure and adapted to receive a ball mounted to a second structure comprising, in combination:
   a mounting element;
   a chuck having a top end and a base at a bottom end opposite the top end, the chuck attached to the mounting element at the top end; and
   a locking assembly adapted to releasably secure the ball and the chuck, comprising at least one jaw mounted on the chuck and a ring gear mounted around the chuck and movable from a locking position wherein the chuck is secured with the ball, to an unlocking position where the chuck is unlocked from the ball, wherein the ring gear translates from the base toward the top end of the chuck as the ring gear moves from the locking position to the unlocking position;
   wherein the chuck has an opening corresponding to the at least one jaw wherein the at least one jaw can move in the corresponding opening radially outwardly from the aperture and is restricted from moving entirely into the aperture and wherein the chuck opening has a narrowing and the at least one jaw has a ledge sized to abut against the narrowing to limit radial inward travel of the at least one jaw into the aperture.

2. The gooseneck trailer coupler of claim 1 further comprising a ball aperture extending from the base of the chuck into the chuck, and the ball aperture is adapted to receive the ball.

3. The gooseneck trailer coupler of claim 2 wherein the at least one jaw mounted on the chuck is biased by the ring gear into the ball aperture when the ring gear is in the locking position.

4. The gooseneck trailer coupler of claim 1 wherein the ring gear rotates around the chuck as it moves from the locking position to the unlocking position.

5. The gooseneck trailer coupler of claim 1 further comprising a pinion gear mounted on the chuck and engaged with the ring gear such that rotation of the pinion gear rotates the ring gear between the locked and unlocked positions.

6. The gooseneck trailer coupler of claim 1 further comprising a release lever assembly operable to move the ring gear between the locking and unlocking positions, the release lever assembly comprising a handle pivotable from a stow position to a release position.

7. The gooseneck trailer coupler of claim 6 wherein the mounting element is an elongate member extending longitudinally along a first axis and the handle in the stow position is aligned generally parallel with the first axis and the handle in the release position is aligned generally perpendicular to the first axis.

8. The gooseneck trailer coupler of claim 6 further comprising a handle sleeve mounted around the handle, movable between a down position and an up position, wherein the handle is prevented from moving from the stow position to the release position when the handle sleeve is in the down position.

9. The gooseneck trailer coupler of claim 8 further comprising a housing mounted on the chuck, the housing having a ramp and receiving a spring, wherein the spring biases the handle against the ramp when the handle is in the releasing position.

10. The gooseneck trailer coupler of claim 8 further comprising a spring biasing the handle sleeve toward the down position.

11. A gooseneck trailer coupler affixed to a first structure comprising, in combination:
    a tube;
    a chuck attached to the tube and having an aperture to receive a projection extending from a second structure;
    at least one jaw mounted in the chuck;
    a ring gear mounted around the chuck and engaging the at least one jaw, wherein the ring gear moves from a locking position where the ring gear urges the at least one jaw into the aperture to an unlocking position where the at least one jaw is free to move sufficiently out of the aperture to permit the projection to be disengaged from the chuck;
    a pinion gear operatively engaged with the ring gear and provided with a ledge; and
    a handle movable from a stow position to a release position, pivotably mounted on the pinion gear, and having a handle end with a square end surface and a ramped end surface;
    wherein the ramped end surface is of sufficiently small radius that the ramped end surface clears the ledge of the pinion gear, permitting the handle to continue to pivot with respect to the pinion gear, and the square end surface has a radius which does not permit the handle to clear the ledge of the pinion gear.

12. The gooseneck trailer coupler of claim 11 wherein three jaws are radially spaced around the aperture.

13. The gooseneck trailer coupler of claim 11 wherein the projection is a ball having a neck narrower than the ball, and the at least one jaw has a spherical surface sized to receive the neck when the ring gear is in the locking position, preventing the ball from exiting the aperture.

14. The gooseneck trailer coupler of claim 11 wherein the chuck has an opening corresponding to the at least one jaw wherein the at least one jaw can move in the corresponding opening radially outwardly from the aperture and is restricted from moving entirely into the aperture.

15. The gooseneck trailer coupler of claim 14 wherein the chuck opening has a narrowing and the at least one jaw has a ledge sized to abut against the narrowing to limit radial inward travel of the at least one jaw into the aperture.

16. The gooseneck trailer coupler of claim 14 wherein the at least one jaw has a back and a tower and when the ring gear is in the locking position the ring gear engages the base to restrict radial outward movement of the at least one jaw, and when the ring gear is in the unlocking position the at least one jaw is free to move radially outward until the tower engages the ring gear.

17. The gooseneck trailer coupler of claim 11 wherein the ring gear has at least one radially inwardly extending projection which engages a corresponding slot in the chuck such that the slot limits the movement of the ring gear.

18. A gooseneck trailer coupler affixed to a first structure comprising, in combination:
    a tube;
    a chuck attached to the tube and having an aperture to receive a projection extending from a second structure;
    at least one jaw mounted in the chuck;

a ring gear mounted around the chuck and engaging the at least one jaw, wherein the ring gear moves from a locking position where the ring gear urges the at least one jaw into the aperture to an unlocking position where the at least one jaw is free to move sufficiently out of the aperture to permit the projection to be disengaged from the chuck;

a pinion gear operatively engaged with the ring gear and having a pinion gear end with a square end surface and a ramped end surface;

a handle movable from a stow position to a release position, pivotably mounted on the pinion gear;

a handle sleeve mounted around the handle, movable between a down position and an up position, wherein the handle sleeve must be moved to the up position to permit the handle to pivot on the pinion gear; and a handle sleeve spring biasing the handle sleeve toward the down position, wherein the ramped end surface of the pinion gear has a radius adapted for clearing the handle sleeve as the handle sleeve returns to the down position without the handle returning to the stow position.

* * * * *